United States Patent [19]

Koike

[11] 4,329,816
[45] May 18, 1982

[54] WINDOW GLASS MOVEMENT GUIDE APPARATUS

[75] Inventor: Shoichi Koike, Higashimurayama, Japan

[73] Assignee: Nissan Motor Co., Ltd., Yokohama, Japan

[21] Appl. No.: 123,097

[22] Filed: Feb. 20, 1980

[30] Foreign Application Priority Data

Feb. 27, 1979 [JP] Japan .......................... 54/25054[U]
Mar. 14, 1979 [JP] Japan .......................... 54/33258[U]

[51] Int. Cl.$^3$ ............................................. E05F 11/44
[52] U.S. Cl. ........................................ 49/350; 49/351; 49/360; 49/375
[58] Field of Search .................... 49/360, 348–353, 49/374, 375, 502, 452

[56] References Cited

U.S. PATENT DOCUMENTS 2,481,535  9/1949  Roethel .............................. 49/452 X
3,093,404  6/1963  Probst ................................ 49/351 X
4,051,632 10/1977  Fukomoto et al. ............... 49/375 X

FOREIGN PATENT DOCUMENTS 868658  6/1961  United Kingdom ................. 49/375

Primary Examiner—Kenneth Downey
Attorney, Agent, or Firm—Silverman, Cass & Singer, Ltd.

[57] ABSTRACT

Guide apparatus for guiding the movement of a vehicle window pane comprises a regulator mechanism for raising and lowering the window pane and a guide mechanism for regulating the locus of movement thereof. The regulator mechanism consists of X-shaped crossing movable arms, the upper ends of which slide along a horizontal guide channel secured on the window pane, and the lower ends of which slide along another horizontal guide channel secured on an inner panel of a door. The arms are driven by a handle. The guide mechanism includes a tubular guide track, a bottom of which is pivoted on the door inner panel. The guide track slides vertically through a single guide member secured on the window pane. Accordingly, the inclination of the window pane is always held unchangeable, so that it is very easy and simple to adjust the securing position of the guide member secured thereon in the horizontal direction. Moreover, a lubricating material is enclosed in the guide member, so that the tubular guide track can slide smoothly through the guide member.

5 Claims, 13 Drawing Figures

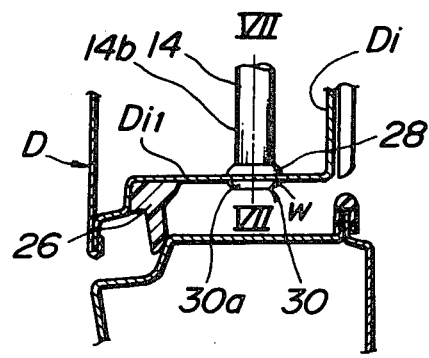
FIG_6
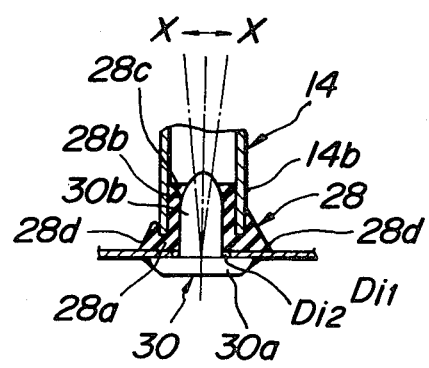
FIG_7
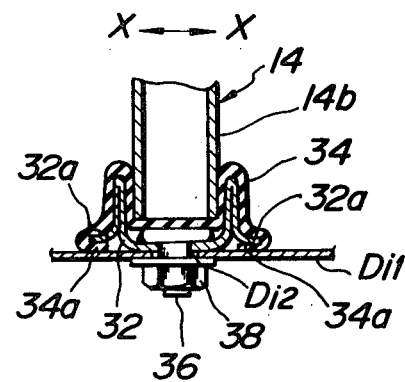
FIG_8
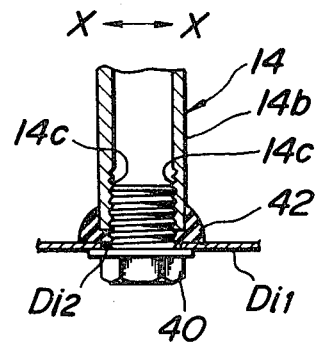
FIG_9

WINDOW GLASS MOVEMENT GUIDE APPARATUS

BACKGROUND OF THE INVENTION (1) Field of the Invention

The present invention relates to a window pane movement guide apparatus, particularly, an apparatus consisting of the combination of a window regulator mechanism for raising and lowering a vehicle window pane and a guide mechanism for regulating the locus of movement of the window pane.

(2) Description of the Prior Art

A conventional guide apparatus of this type comprises a tubular guide track included in the guide mechanism, a bottom of which is secured rigidly on an inner panel of a door. The guide track slides vertically through a pair of guide members secured on a bottom of the window pane. This pair of guide members is required for holding the inclination of the window glass unchangeable during raising and lowering of the window pane along the guide track by the regulator mechanism, consisting of a single movable arm which is driven by a handle. In a conventional guide apparatus, it is very troublesome and difficult to adjust the securing position of the tubular guide track in the horizontal direction, since one must shift the pair of guide members and hence the secured bottom of the guide track in parallel with each other in such a manner that the predetermined original direction of the guide track is maintained exactly.

Furthermore, in a conventional guide apparatus, a lubricating material, that is, an amount of grease, is applied on a surface of the tubular guide track so as to insure smooth sliding through the guide members. However, the lubricating material is scraped off of the surface of the guide track after a long term usage, so that the movement of the window pane is apt to cause rattling and the operability thereof is impaired extremely.

SUMMARY OF THE INVENTION

An object of the present invention is to provide a guide apparatus for guiding the movement of a vehicle window glass wherein it is easy and simple to adjust the securing position of a guide mechanism which guides the pane during raising and lowering of the same.

Another object of the present invention is to insure the smooth operation of the guide mechanism during the raising and lowering of the window pane.

The present invention includes a regulator mechanism consisting of X-shaped crossing movable arms, so that it is possible to simplify the structure of the guide mechanism to a single guide member used to regulate the direction of the guide track provided for guiding the movement of the window pane. As a result thereof, the adjustment of the securing position of the guide member as well as the guide track regulated thereby can be simplified and facilitated remarkably, and besides that an amount of lubricating material is reserved in a recess provided in the guide member and is prevented from being removed therefrom by a cap which covers the recess, so that the smooth sliding therethrough of the tubular guide track can be insured permanently.

The present invention will be explained in detail with reference to the following drawings.

BRIEF DESCRIPTION OF THE DRAWINGS

FIG. 6 is a longitudinal cross-section showing an essential portion of the structure for securing a bottom of the guide track thereof;

FIG. 7 is a longitudinal cross-section showing a portion around a line VII—VII in FIG. 6;

FIGS. 8 and 9 are longitudinal cross-sections showing other examples of the above portion respectively;

DESCRIPTION OF THE PREFERRED EMBODIMENTS

A typical, conventional guide apparatus of the above mentioned kind is explained with reference to FIG. 1.

Figure 1:
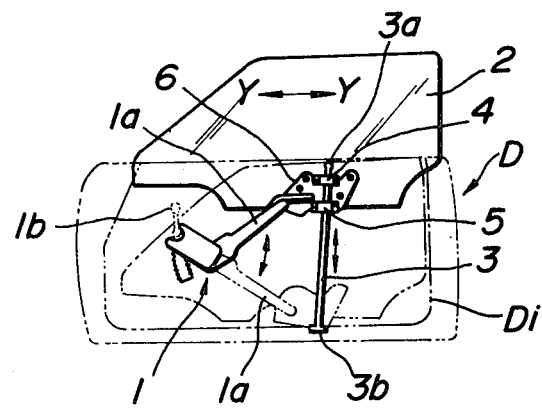
FIG. 1 is a side-view showing a conventional window pane movement guide apparatus.
Figure 2:
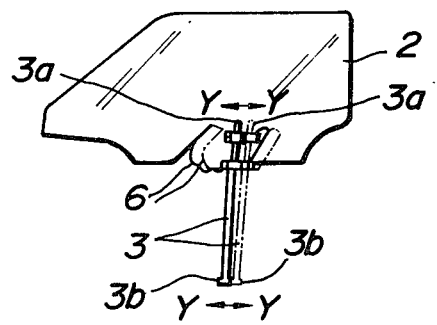
FIG. 2 is another side-view showing a manner of adjusting the securing position of a window pane thereof.

In FIG. 1, a regulator 1 of the single arm type is mounted on an inner panel Di of a door D. A window pane 2, a bottom of which is fitted rotatably with an end of an arm 1a, is raised and lowered by the operation of a handle 1b of the regulator 1. A tubular guide track 3 has a top 3a and a bottom 3b which are secured on the inner panel Di of the door D. Guide members 4 and 5 are secured respectively on upper and lower ends of a plate 6, which is fitted with the bottom of the window pane 2 and through which the tubular guide track 3 slides in contact therewith.

The guide track 3 and two guide members 4 and 5 form a guide mechanism for regulating the locus of movement for raising and lowering of the window pane 2.

However, when the combination of the regulator 1 and the guide mechanisms 3, 4, 5 are employed as mentioned above, to adjust the position thereof with the window pane 2 by a small amount back and forth in the direction Y—Y, it is required to shift those two guide members 4 and 5 in the direction Y—Y so that the parallel relation thereof is maintained and to shift the guide track 3 also so that the axial direction thereof is maintained parallel.

The following difficulties are caused when shifting the guide track 3 and the guide members 4 and 5 in parallel as mentioned above.

It is difficult to maintain the parallel relation thereof, since those two guide members 4 and 5 are shifted so that the parallel relation thereof is maintained, and besides it is troublesome to shift the guide track 3 so that the axial direction thereof is maintained parallel, since both of the top 3a and the bottom 3b should be shifted at the same time. Consequently, it is required to perform the above adjustment by means of repeated trial and error, so that the operability thereof is impaired extremely.

Figure 3:
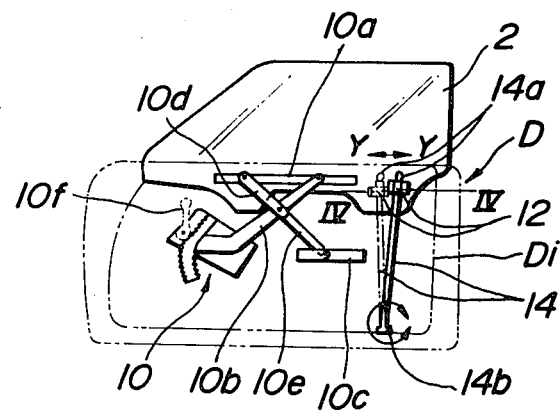
FIG. 3 is a side-view showing a preferred embodiment of the present invention.

In contrast therewith, X-shaped crossing arms 10 are employed in the regulator of the preferred embodiment of the present invention, as is shown in FIG. 3. A main arm 10b thereof is connected with the bottom of the window pane 2 through a guide channel 10a, and sub-arms 10d and 10e are connected with the guide channel 10a and another guide channel 10c which is secured on the inner panel Di of the door D, respectively. Therefore, the window pane can be raised and lowered by operating a regulator handle 10f.

It is noteworthy, in relation to the above, that the guide channel 10a is raised and lowered as the inclination thereof shown in FIG. 3 is maintained. This noteworthy fact is the feature of these X-shaped crossing arms 10. Accordingly, it can be very easy to shift the window pane 2 back and forth parallelly in the direction Y—Y, since the inclination thereof is restricted by the guide channel 10a. In the aforesaid conventional apparatus wherein the regulator is of a single arm type, the inclination of the window pane 2 is restricted by the two guide members 4 and 5.

In the embodiment shown in FIG. 3, a single guide member 12 is formed of plastic material and is secured on the rear bottom of the window pane 2 in such a manner that the securing position thereof can be adjusted back and forth in the direction Y—Y. A tubular guide track 14, a top 14a and a bottom 14b of which are secured on the inner panel Di of the door D, slides through the guide member 12, so as to regulate the locus of movement of the pane 2 during raising and lowering of the window pane 2.

Figure 4:
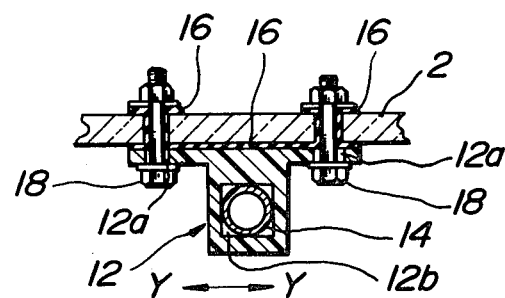
FIG. 4 is a cross-section along the line IV—IV in FIG. 3 showing the structure relating to a window pane, a guide member and a guide track thereof.

In the structure for securing the guide member 12 on the window pane 2 as shown in FIG. 4, the guide member 12 is secured on the window pane 2 by two bolts 18 through two bushings 16, respectively. The shape of through-holes 12a provided for these bolts 18 respectively is elongated so that the securing position thereof can be adjusted back and forth in the direction Y—Y in such a manner that the tubular guide track 14 is held through the guide member 12. The guide member 12 is provided with a square shaped through-hole 12b which contacts with four portions of the exterior surface of the tubular guide track 14, so as to guide the window pane 2 along the guide track 14 both upwardly and downwardly.

Figure 5:
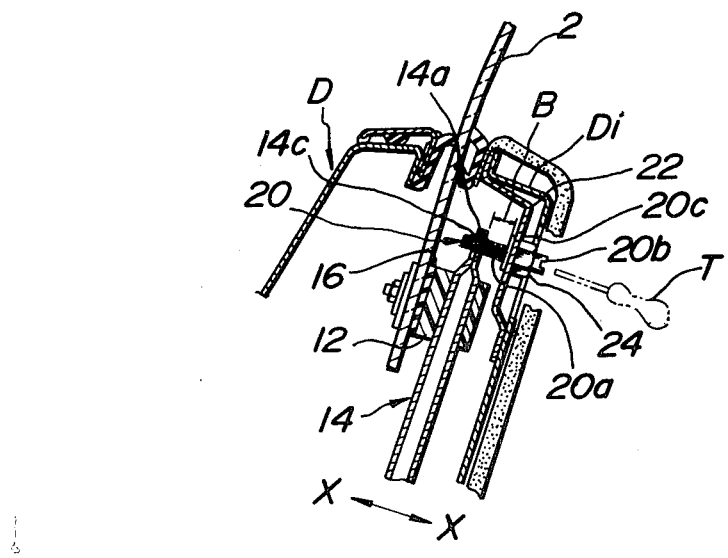
FIG. 5 is a longitudinal cross-section showing an essential portion of a guide track adjusting means thereof.

In the structure for securing the top 14a of the guide track 14 on the window pane 2 as shown in FIG. 5, the top 14a of the guide track 14 is formed by a squashed tube and is provided with a tapped hole 14c, in which an adjusting bolt 20 is screwed. The adjusting bolt 20 is secured on a reinforcement 22 of the door inner panel Di, and adjusts the track 14 a distance B in the direction of car width between the reinforcement 22 of the door inner panel Di and the tubular guide track 14. The adjusting bolt 20 is formed of a shank 20a screwed in the tapped hole 14c, an engaging portion 20b which is provided on an end thereof towards the door inner panel Di for engaging with an adjusting tool T and a seating member 20c which is projected on a middle portion of the shank 20a so as to engage with an inner face of the reinforcement 22 of the door inner panel Di. The adjusting bolt 20 is screwed by a securing nut 24 on the outer face of the reinforcement 22 of the door inner panel Di, so as to hold the reinforcement 22 of the door inner panel Di between the seating member 20c and the securing nut 24.

As a result thereof, when the shank 20a is rotated by means of the adjusting tool T, the relative position between the tapped hole 14c of the guide track 14 and the shank 20a is varied, so that it is possible to adjust the distance B, which is in the direction of the car width between the guide track 14 and the reinforcement 22 of the door inner panel Di.

As mentioned above, the tapped hole 14c, the adjusting bolt 20 and the securing nut 24 form the means for adjusting the position of the top 14a of the guide track 14 in the direction X—X of car width.

In the structure for fitting the bottom 14b of the guide track 14 on the door inner panel Di as shown in FIGS. 6 and 7, the bottom 14b of the guide track 14 is connected inside of a fitting portion of a door weather strip 26, to a bottom wall Di1 of the door inner panel Di through a resilient insulating and sealing member 28.

In the above connecting structure, as shown in FIG. 7, the bottom wall Di1 is penetrated by a joint pin 30, having a top of bullet shape through a hole Di2 from the outside of the car. A head 30a of pin 30 is welded on the bottom wall Di1 of the door inner panel Di.

On the other hand, inside of a tubular bottom portion 14b of the guide track 14, a shank 30b of the joint pin 30 is secured within the insulating and sealing member 28 which is inserted therein. The insulating and sealing member 28 is formed of a base portion 28a which surrounds both of the outside and the inside of the tubular bottom portion 14b of the guide track 14, a column portion 28b which projects upwards from the base portion 28a and is fitted within the inner wall of the guide track 14 and a hole portion 28c which is cut through the base portion 28a and the column portion 28b and into which the shank 30b of the joint pin 30 is inserted. A bottom fringe of the base portion engages elastically with the bottom wall of the door inner panel Di, so as to form a lip 28d provided for sealing the inside and the outside of the door D.

Accordingly, the guide track 14 is secured on the door inner panel Di by means of attaching the top 14a thereof with the door inner panel Di, adjustably in the direction X—X, and inserting the joint pin 30, projected inside of the door inner panel Di from the outside of the car body, into the bottom portion 14b through the intermediate of the insulating and sealing member 28. Thus, the guide track 14 can be deflected in the direction X—X of the car width from the axis of the joint pin 30, around a fulcrum consisting of the joint pin 30, by an amount determined by the aforesaid adjusting means for the guide track 14, as shown by chain lines in FIG. 7.

According to the above mentioned structure, the backward and forward adjustment of the installing position of the window pane 2 in the direction Y—Y can be performed very simply merely by means of loosening the bolts 18 engaging the guide member 12, shifting the window pane 2 in parallel by a distance provided by the through holes 12a and then tightening the bolts 18 again. During the above shift of the window pane 2, the main arm 10b and the sub-arm 10d of the regulator 10 slide along the guide channel 10a back and forth in the direction Y—Y only, so that the inclination of the window pane 2 is not varied at all, and the window pane 2 is shifted always along the guide channel 10a which is disposed at a predetermined installation position. The above adjustment of the installation position is restricted to such a narrow range that it is not required to change the securing position of the regulator 10.

Other embodiments relating to the structure for fitting the bottom portion 14b of the guide track 14 will be explained as follows.

In the structure shown in FIG. 8, a substantially bell-shaped bracket 32 is engaged on the base portion 14b of the guide track 14 through an insulating and sealing member 34. A joint pin 36, welded on the bracket 32, penetrates the bottom wall Di1 of the door inner panel Di, and is tightened by a nut 38 from the outside of the bottom wall, so as to secure the bottom portion 14b of the guide track 14 on the bottom wall Di1 of the door inner panel Di. Furthermore, a lip 34a of the insulating and sealing member 34 is extended between a bottom edge 32a of the bracket 32 and the bottom wall Di1 of the door inner panel Di.

In the above mentioned embodiment, the guide track 14 can be deflected at the fulcrum consisting of the joint pin 36, since the insulating and sealing member 34 is bent by an amount corresponding to a distance wherein the top 14a of the guide track 14 is shifted in the direction X—X of the car width by the aforesaid adjusting means.

In the structure shown in FIG. 9, a tapped portion is provided on an inner face of the bottom of the tubular guide track 14, and a tightening bolt 40, which is inserted into a filling hole Di2 provided on the bottom wall Di1 of the door inner panel Di is screwed on the tapped portion 14c, so as to secure the bottom portion 14b of the guide track 14 on the bottom wall Di1 of the door inner panel Di. Furthermore, an insulating and sealing member 42 is applied on the bottom portion 14b of the guide track 14, so as to seal the inside and the outside of the door D.

The above-mentioned embodiment is preferable where the adjustment of the installation position of the window pane 2 is a small amount and the securement of the bottom portion 14b of the guide track 14 is required.

By referring to all of the above-mentioned embodiments only the movement guide apparatus which is installed on the door of the vehicle is explained. However, the above explained movement guide apparatus can be applied also for a window pane installed on the side portion of the car body, for example, on a rear side window of a hard-top car, in which the regulator and the guide track of the guide apparatus are fitted on an inner panel of a side portion of the car body.

As explained above, according to the present invention, it is possible to guide the raising and lowering of the window pane with a single guide member by virtue of employing a window pane regulator of X-shaped crossing movable arm type, so that the adjustment of the installation position of the window pane in the front and rear direction of the car body is simplified by shifting only one guide member, and the working property is improved remarkably.

The operation of the above mentioned embodiments will be explained briefly.

The adjustment of the securing position of the guide track in the direction of the car width can be performed simply by rotating an adjusting bolt with a tool, according to the adjusting means explained above, so that the adjusting operation is simplified. Furthermore, the bottom portion of the guide track is secured on the car body through a sealing member, so that it is possible to prevent the invasion of water, dust, etc. from the outside of the car body, and it is possible also to prevent the rattling noise and the metallic sound caused between the guide track and the inner panel of the door or the car body by the adjusting operation of the securing position of the guide track in the direction of the car width. As a result, the sealing member performs as an insulator sufficiently, and hence, the quality of the car body can be improved remarkably.

In particular, according to the securing structures shown in FIGS. 7 and 8 respectively, the guide track can be deflected at the fulcrum consisting of the joint pin during the adjusting operation of the securing position of the guide track in the direction of car width, so that it is not required to adjust the position of the bottom of the guide track, and, as a result the adjusting operation can be simplified.

On the other hand, according to the securing structure shown in FIG. 9, particularly where the adjustment of the securing position of the guide track by a small amount only in the direction of car width, is required, it is possible to secure the guide track on the inner panel of the car body or the door simply and tightly, so that the remarkable effect of preventing the rattling noise permanently is obtained.

Next, the smoothing of the movement of the vehicle window pane according to the present invention will be explained.

Figure 10:
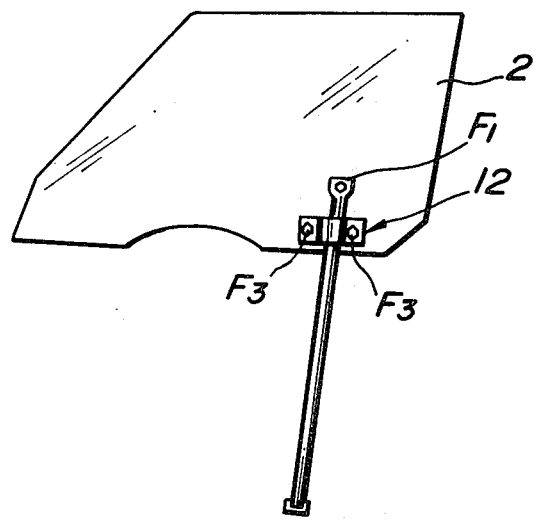
FIG. 10 is a simplified side-view showing a guide mechanism of a conventional guide apparatus.

In general, as is shown schematically in FIG. 10, the window pane 2 in a sashless vehicle door is installed on the door in such a manner that the top F1 and the bottom F2 of the tubular guide track 14, the axis of which is upwardly and downwardly of the car body, are secured on an inner panel (not shown) of the door. A guide member 12, formed of plastic material and through which the tubular guide track 14 slides, is secured on the window pane 2 at two securing positions F3, so that, when the window pane 2 is moved by a window regulating mechanism (not shown), the window pane 2 is raised and lowered along the guide track 14, so as to regulate the locus of movement of the pane 2 during raising and lowering.

Figure 11:
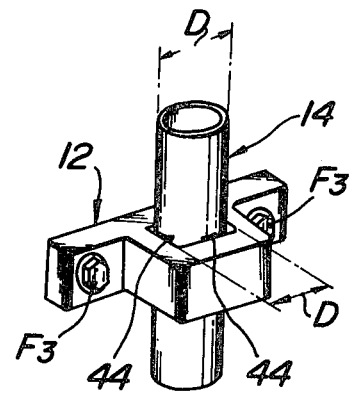
FIG. 11 is an enlarged perspective view showing an essential portion thereof.

However, in the conventional movement guide apparatus, the relation between the guide track 14 and the guide member is formed as shown in FIG. 11. The cross-section of the tubular guide track 14 is shaped substantially as a perfect circle, and the inner surface of the guide member 12 is shaped as a regular square, a side length of which is equal to the diameter D of the tubular guide track 14. Thus, the guide member 12 and the guide track 14 contact with each other at four portions 44, wherein a lubricating material, for instance, grease is applied between sliding surfaces of the guide member 12 and the guide track 14, so as to insure a smooth sliding therebetween. However, the lubricating material is applied in the manufacturing process of the car body wherein the guide member 12 and the guide track 14 are joined, so that the lubricating material on the surface of the guide track 14 is apt to be scraped off after a long term usage or is apt to be carried away by water which is splashed inside of the door. Accordingly, the disappearance of the lubricating material from the sliding surfaces, which are worn thereby, causes such difficulties that a rattling noise is generated and the operability of the window regulating mechanism is impaired.

Figure 12:
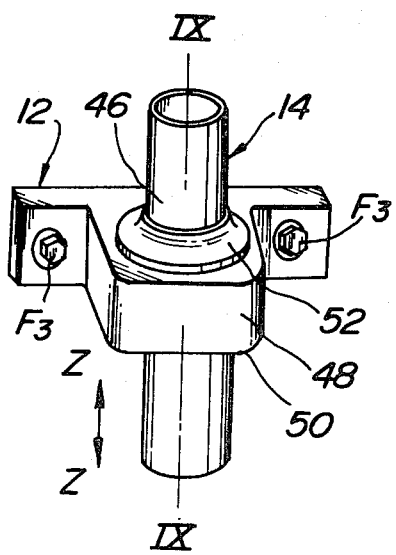
FIG. 12 is an enlarged perspective view showing a portion corresponding to the above essential portion according to the present invention.
Figure 13:
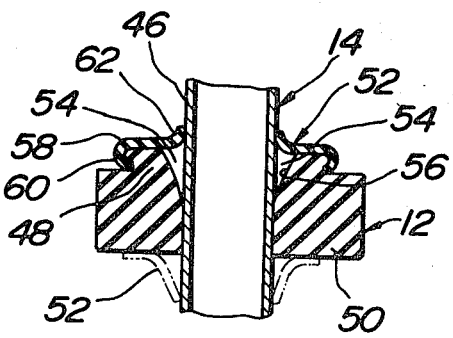
FIG. 13 is a longitudinal cross-section along a line IX—IX in FIG. 12.

In contrast therewith, the structure shown in FIGS. 12 and 13 is provided according to the present invention. A recess 56 is formed inside of the upper end portion 48 of the guide member 12 opposite the outer surface 46 of the guide track 14 and along the sliding direction Z—Z. A lubricating material 54 is inserted in the recess 56, and the recess 56 is covered by a cap 52 formed of rubber or plastic material, which cap 52 is installed on the upper end portion 48 of the guide member 12. For the purpose of installing the cap 52, the guide member 12 is provided with a hook portion which engages with a fitting base portion 60 of the cap 52, and an upper end portion of the cap 52 slidably contacts with the outer surface 46 of the guide track 14. Furthermore, the recess 56 can be provided also on the lower end portion 50 of the guide member 12 as shown by a dotted line in FIG. 13, on which another cap 52 can be installed also.

According to the above mentioned structure, the lubricating material 54 does not disappear even after long term usage, as long as it is reserved in the recess 56, so that the permanent usage can be expected. Moreover, the cap 52 acts as an umbrella against the aforesaid splash of water, to prevent the lubricating material 54 from being carried away. Accordingly, it is possible to insure the smooth sliding between the guide member 12 and guide track 14 permanently.

By referring to the above mentioned structure, the improved guide mechanism applied to a window pane which is installed on the vehicle door is explained above. However, the above mentioned structure can be applied to the side window of the car body also.

In this case, the guide track 14 is fitted with the side panel of the car body, and the guide member 14 is secured on the side window pane.

What is claimed is:

1. A window pane movement guide apparatus comprising:
    at least one guide member which is adjustably secured on a window pane, the guide member providing a hole therethrough;
    at least one tubular guide track which is attached to a side of one of a car door and a car body, the guide track being slidably engaged in said hole through said guide member;
    resilient connection means between a bottom portion of said tubular guide track and said one of a car door and a car body; and
    regulating means provided with X-shaped crossing movable arms which are slidably connected with a bottom portion of said window pane, when operated, said regulating means for raising and lowering said window pane along a locus of movement which is axial of said tubular guide track;
    so that the guide member may be adjusted relative to the window pane free of adjusting the regulating means and the guide track.

2. The apparatus as claimed in claim 1 in which said resilient connection means include a resilient insulating and sealing member, and said bottom portion of said tubular guide track is connected with a bottom wall of an inner panel of said one of a car door and a car body through said resilient insulating and sealing member.

3. The apparatus as claimed in claim 2 in which said resilient insulating and sealing member includes a base portion attached to the bottom of said tubular guide track, a column portion projecting upward from said base portion and a hole through said column portion from said base portion and said resilient connection means further including a connection pin projecting from said inner panel into said hole of said column portion so that said guide track can be deflected on said connection pin.

4. The apparatus as claimed in claim 2 in which an inner surface of said bottom portion is threaded, said resilient insulating and sealing member is attached to the base portion, and said resilient connecting means include a threaded bolt passing through a hole through said inner panel from the outside of said inner panel, said threaded bolt engaging with said thread inner surface of said bottom portion.

5. The apparatus as claimed in claim 2 in which said guide member hole includes a recess spaced from said guide track when said guide track is engaged therethrough, said guide member further including lubricating material inserted in said recess and cap means engaged on said guide member and slidably engaged with said guide track for sealing said lubricating material in said recess.

* * * * *